Dec. 11, 1956
R. R. WHIPPLE
2,773,651
COIL WINDING APPARATUS
Filed Nov. 13, 1952
2 Sheets-Sheet 1
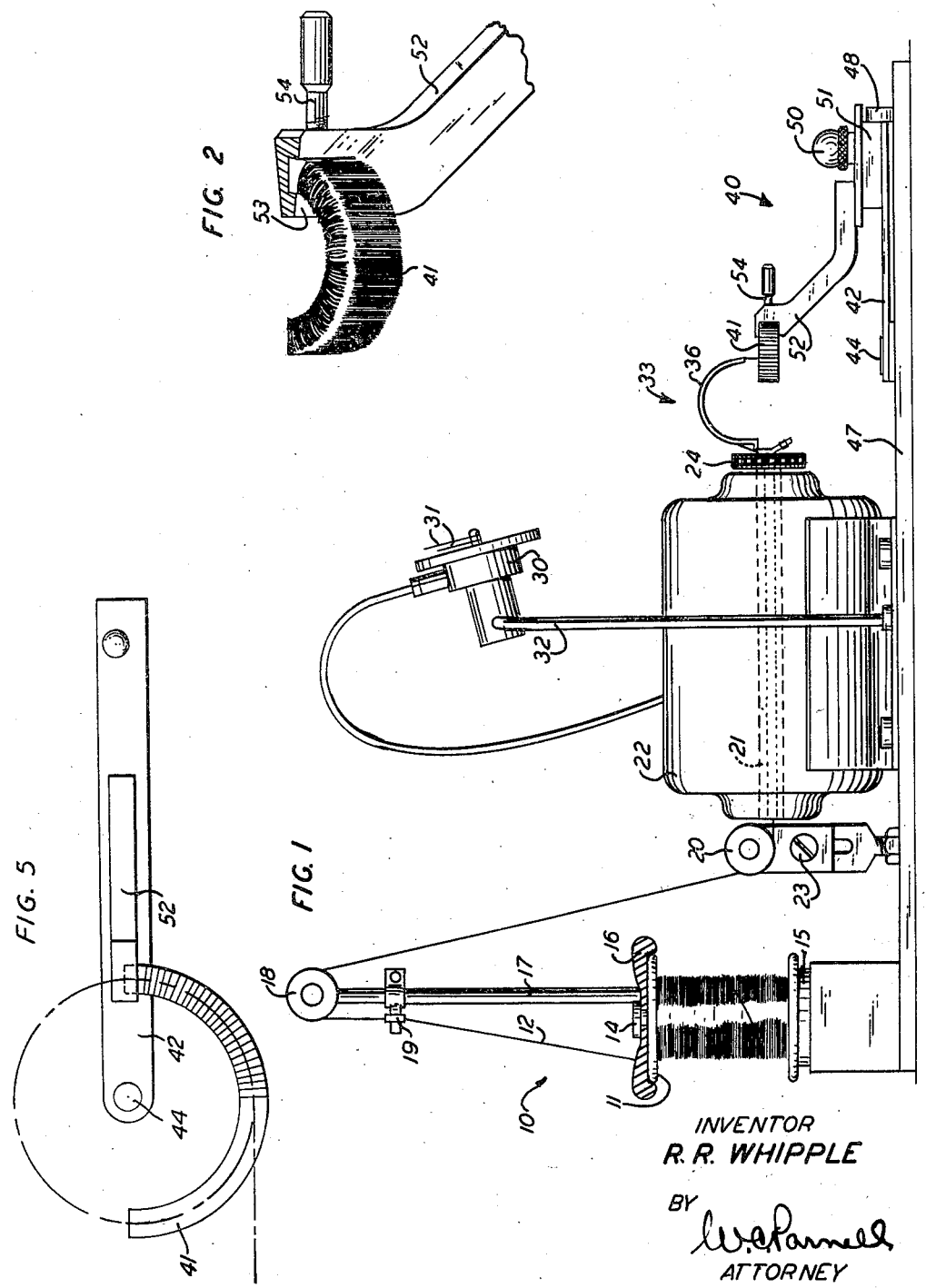
INVENTOR
R. R. WHIPPLE
BY
W. A. Parnell
ATTORNEY Dec. 11, 1956  R. R. WHIPPLE  2,773,651
COIL WINDING APPARATUS
Filed Nov. 13, 1952  2 Sheets-Sheet 2
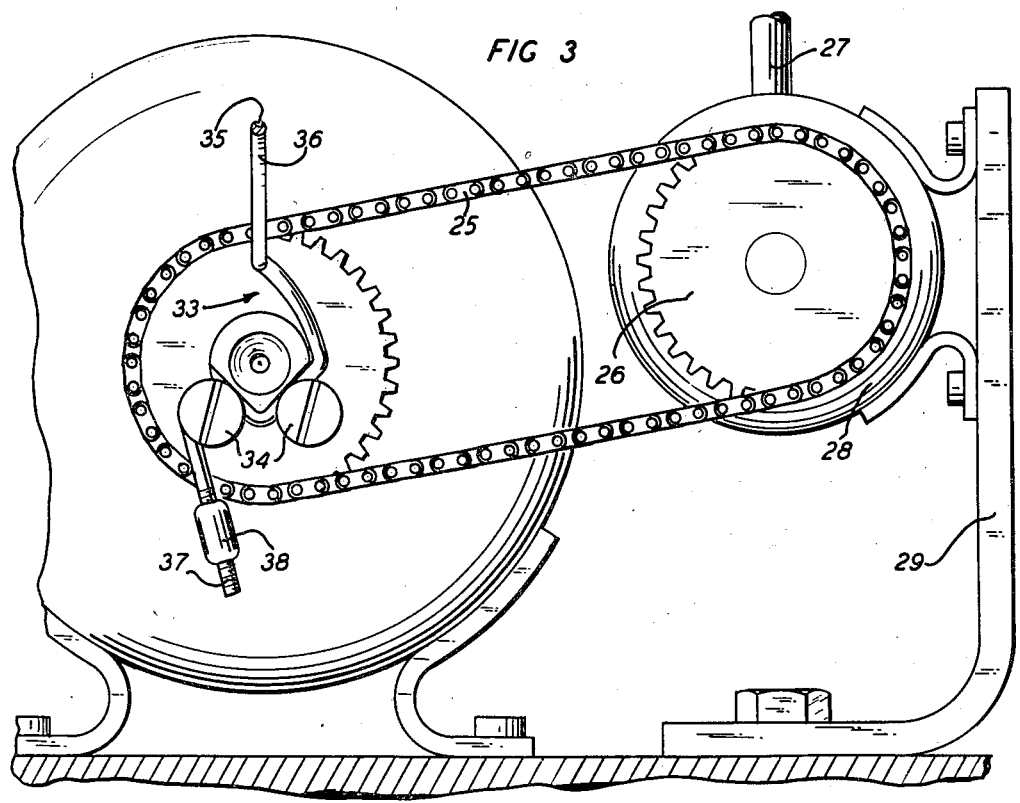
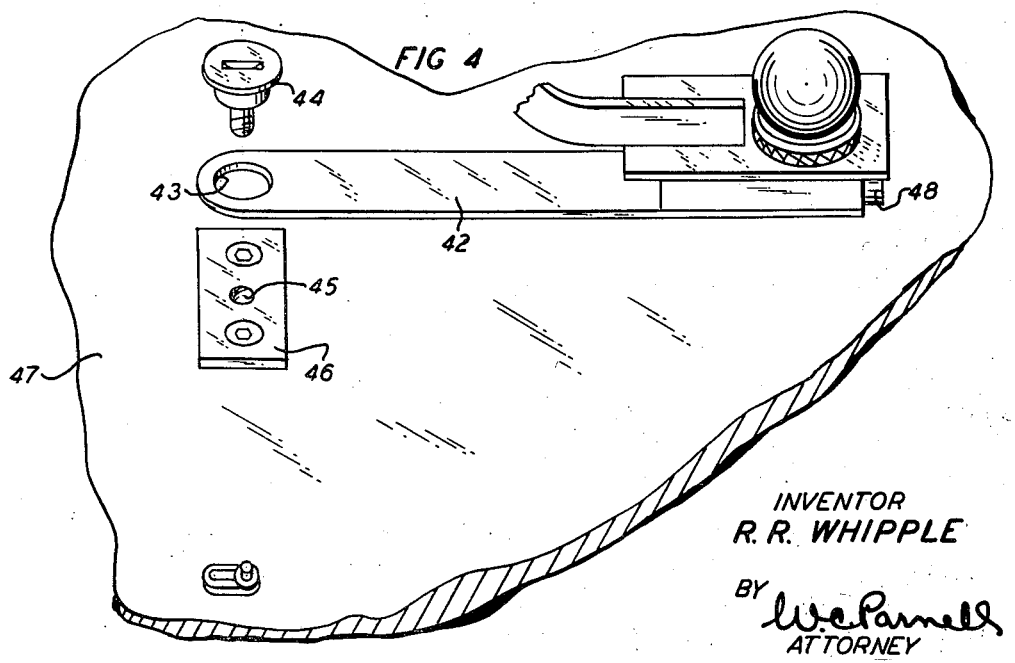
INVENTOR
R. R. WHIPPLE
BY
W.C. Parnell
ATTORNEY

United States Patent Office 2,773,651
Patented Dec. 11, 1956

2,773,651

COIL WINDING APPARATUS

Richard R. Whipple, Haverhill, Mass., assignor to Western Electric Company, Incorporated, New York, N. Y., a corporation of New York Application November 13, 1952, Serial No. 320,191

1 Claim. (Cl. 242—4)

This invention relates to strand winding apparatus and more particularly to toroidal coil winding machine.

In the communication art there has been an increasing demand for smaller toroidal coils and the progressive reduction in the size of the cores has made it more difficult to wind such coils on machines of conventional types in which a flyer slides on a shuttle interlinked with the cores.

Many of the coils now required are so small that the winding substantially fills the aperture in the core and it is therefore impossible to wind them on a shuttle type machine. Hand winding of such coils is very laborious and expensive and the old expedient of cracking the core into segments, placing prewound coils thereon and then reassembling the core does not produce coils with the required electrical characteristics. These very small coils, moreover, are wound with such fine wire that even the cracked core segments cannot be wound satisfactorily with shuttle type machines since the wire cannot withstand the tension produced therein by pulling it from the shuttle and closing the loops about the core.

The object of the present invention is an apparatus which is simple in structure and highly efficient for winding strands on segmental toroidal cores.

With this and other objects in view, the invention comprises a support for a segment of a toroidal core mounted for rocking movement about the center of curvature of the core, a hollow driven shaft mounted for rotation with its axis substantially aligned with the cross-sectional center of the segment and a flyer secured to the exit end of the shaft and adapted to guide a strand travelling longitudinally through the shaft to wind the strand about the core.

In the present embodiment of the invention, the hollow shaft is a part of an electric motor while the flyer is a counterbalanced, grooved or otherwise hollow member providing the continuation of a smoother path for the strand or wire to travel while being wound about the core under a constant pre-determined tension.

Other objects and advantages will be apparent from the following detailed description when considered in conjunction with the accompanying drawings, wherein:

Fig. 1 is a side elevational view of the apparatus;

Fig. 2 is an enlarged fragmentary isometric view showing a portion of the core supporting unit;

Fig. 3 is a front elevational view of the motor with the flyer and the driving means for a counter unit;

Fig. 4 is a fragmentary exploded view of the core supporting unit, and

Fig. 5 is a top plan view of the core supporting unit.

Referring now to the drawings, attention is first directed to Fig. 1 which illustrates a supply unit 10 for removably receiving a supply reel 11 of strand material 12, such as wire for use in forming toroidal core coils. The supply reel is held in place by a removable rod 14 extending into a base 15 and through a polished disc-like wire guide 16. Suitable means such as a rod 17 supports a grooved roller 18 at its upper end for guiding the strand after it leaves an adjustable tension unit 19. The strand 12, after leaving the roller 18 of the supply unit, travels about a grooved roller 20 and through a hollow shaft 21 of a motor 22. The roller 20 is adjustably supported at 23 so that it will guide the strand 12 centrally through the hollow shaft. A sprocket 24 is mounted on the outer end of the shaft 21 and is connected by a chain 25 to a sprocket 26 which is operatively connected to a flexible shaft 27 and supported for rotation at 28 on a bracket 29. The flexible shaft 27 extends to, and is operatively connected with, a unit 30 provided with the conventional pointers 31 associated with a dial to register the number of turns of the strand wound on the core. The unit 30 may be of a commercially known type and its detailed structure and operation are not described herein. This unit is supported by a suitable rod or bracket 32 so that the operator may set it prior to starting the winding on a core and in order to know when to stop the motor after a given number of turns have been wound.

A suitable flyer 33 is mounted on the exit end of the shaft 21, the flyer in the present embodiment of the invention being of the contour shown in Figs. 1 and 3, mounted in place by screws 34, having a strand receiving groove 35 in a curved portion 36 thereof, while a substantially diametrically opposed threaded end 37 carries an adjustable counterbalance weight 38.

A core supporting unit 40 is designed to receive and support a segment 41 of a toroidal core to position the center of curvature of the core segment in a vertical plane with the exit end of the flyer 33 when in the winding position shown in Fig. 1 and to make it possible to rock the core about its center to move cross-sectional portions of the core segment into the winding position in central alignment with the axis of shaft 21. The unit 40 includes a laterally extending member 42 apertured at 43 for a pivot or mounting screw 44 which extends into a threaded aperture 45 of a plate 46. The plate 46 is mounted on a base 47 which supports all of the units of the apparatus. The outer end of the arm or member 42 is supported by a roller 48 positioned to ride on the base 47 whereby the unit 40 may be rocked about its pivot 44 to distribute the convolutions of the strand on the core. Movement of the unit may be made possible by the operator gripping a handle 50 mounted on a portion 51 of the member 42 which also supports an arm 52, grooved or otherwise apertured at 53 near its upper end to receive one end of the toroidal core segment. A clamping screw 54 disposed in a threaded aperture of the arm 52 serves to clamp the core segment in the aperture of the arm 52. The circular dot-dash line in Fig. 5 represents the center of the core segment and its path of movement about the center of curvature of the segment which is in alignment with the axis of the pivot 44. The straight dot-dash line in Fig. 5 represents a continuation of the axis of the shaft 21 to show it tangent to the dot-dash circular line, or, in alignment with the center of each cross-sectional portion of the segment when moved into the winding position.

Considering now the operation of the apparatus, let it be assumed that a core segment 41 is mounted in the clamping end or aperture of the arm 52 of the rocking unit 40. Let it be assumed further that a supply reel 11 of strand material 12 is disposed in the unit 10 and that the strand or wire is threaded through the tension unit 19, about the grooved rollers 18 and 20, through the hollow shaft 21 of the motor 22, about the flyer 36, in the groove 35 thereof, and that the leading end of the wire is secured in a conventional manner to the core segment. The indicating unit or counter 30 is set at zero or its starting position after which the motor 22 may be energized to cause rotation of the hollow shaft with the flyer 36 to wind convolutions of the wire on the core.

The operator causes rocking movement of the unit 40 to cause the convolutions to lay uniformly on the core until one layer has been completed, after which the unit 40 may be rocked in the reverse direction for the winding of another layer thereon or still additional layers, if so desired. It will be apparent that the advancement of the wire results from its being wound on the core and although the cross-sectional contour of the core prevents advancement of the wire at a constant speed, the wire is held taut under a pre-determined tension determined by the unit 19, preventing any jerking action on the wire and making it possible to lay extra fine wire on an extremely small toroidal core segment.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

An apparatus for winding turns of a strand on an arcuate segment of a toroidal core comprising means mounted for movement about an axis, an arm secured to said means and extending above said means and substantially toward the axis, clamping means on said arm for receiving and removably gripping one end of an arcuate segment of a toroidal core and for holding the arcuate core segment with its center of curvature in alignment with the axis while successive cross-sectional portions of the segment are moved into a winding position to receive turns of the strand, an energizable motor having a hollow shaft, means to support the motor with the axis of its hollow shaft disposed in a plane at right angles to the axis of said movable means and in alignment with the center of each cross-sectional portion of the segment when in the winding position, means to guide a strand to an entrance end of the hollow motor shaft, a semi-circular flyer secured to the exit end of the hollow motor shaft, positioned laterally in one direction from the hollow motor shaft, and having an external groove therein for receiving the strand from the hollow motor shaft and discharging it in the plane of each cross-sectional portion of the core segment when in the winding position, and an adjustable weight carried by the exit end of the hollow motor shaft and positioned substantially diametrically opposite the flyer to counterbalance it.

References Cited in the file of this patent

UNITED STATES PATENTS

| | | |
|---|---|---|
| 682,142 | Gill | Sept. 3, 1901 |
| 817,883 | Smythe | Apr. 17, 1906 |
| 1,607,242 | De Bold | Nov. 16, 1926 |
| 2,114,287 | Cullin | Apr. 19, 1938 |
| 2,427,079 | Werth | Sept. 9, 1947 |
| 2,437,309 | Veatch | Mar. 9, 1948 |